Aug. 3, 1926.  S. KUCHARSKI  1,594,461
PHOTOGRAPHIC APPARATUS SUITABLE FOR USE WITH ROLL FILMS
Filed March 19, 1923   2 Sheets-Sheet 1
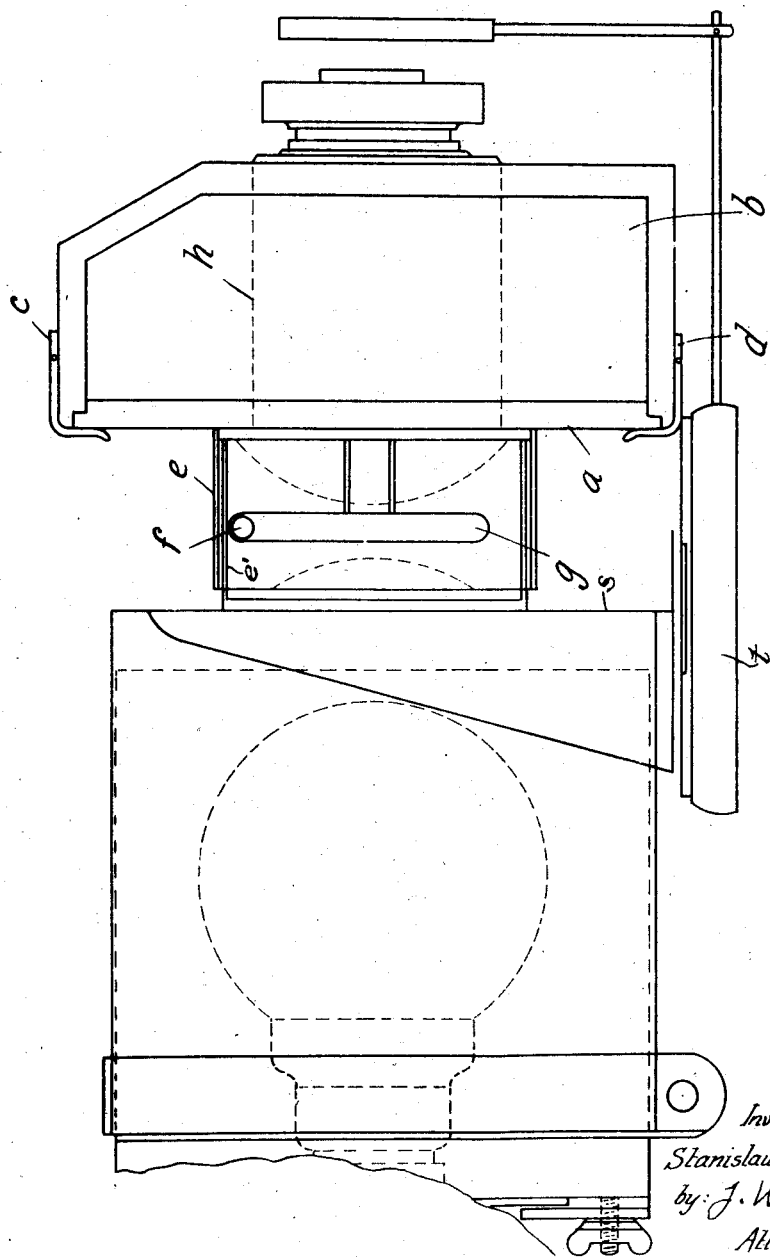
Inventor:
Stanislaus Kucharski
by J. Wetter
Attorney Aug. 3, 1926. 1,594,461
S. KUCHARSKI
PHOTOGRAPHIC APPARATUS SUITABLE FOR USE WITH ROLL FILMS
Filed March 19, 1923 2 Sheets-Sheet 2

INVENTOR,
STANISLAUS KUCHARSKI
BY
ATTORNEY.

Patented Aug. 3, 1926.

1,594,461

UNITED STATES PATENT OFFICE.

STANISLAUS KUCHARSKI, OF CHARLOTTENBURG, GERMANY, ASSIGNOR TO ALFRED HUBER AND WOLFGANG SIMONS, BOTH OF BERNE, SWITZERLAND.

PHOTOGRAPHIC APPARATUS SUITABLE FOR USE WITH ROLL FILMS.

Application filed March 19, 1923, Serial No. 626,206, and in Germany March 25, 1922.

The known photographic cameras with interchangeable devices for producing photographic views on roll-films and for contact printing or for enlarging and projecting the views are generally difficult to handle and unreliable and enable only exceptionally skilled photographers to produce pictures which are tolerably serviceable.

The present improvements have for their object to facilitate these operations and to enable even an amateur to produce faultless pictures.

This object is attained by providing easily interchangeable elements with special devices which enable the operator to convert the apparatus in an optically correct manner, without turning the projection lamp, to suit vertical or horizontal pictures, and by providing an equally interchangeable contact printing attachment which renders it possible to copy every separate photographic view individually in daylight without the use of a dark chamber, with very simple means and by easy manipulations.

In further describing the invention reference will be made to the accompanying drawings which represent an example of construction embodying the invention:

Fig. 1 being a side view and partial section showing a camera-body and projection lens together with the condenser and lamp-casing, Fig. 2 being a vertical section through the device, exchangeable with the ordinary camera back, for contact printing from a negative film picture, so as to obtain a positive film picture.

Figure 3:
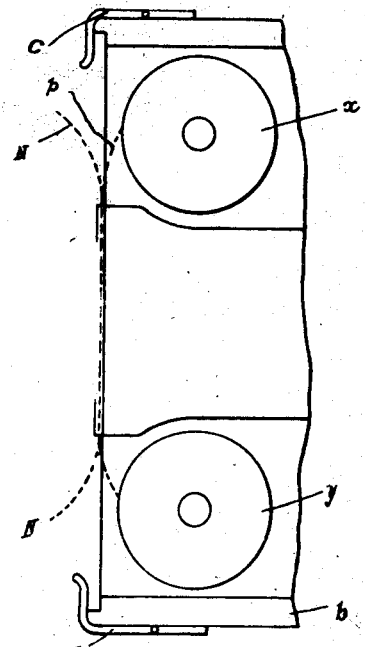
Figure 4:
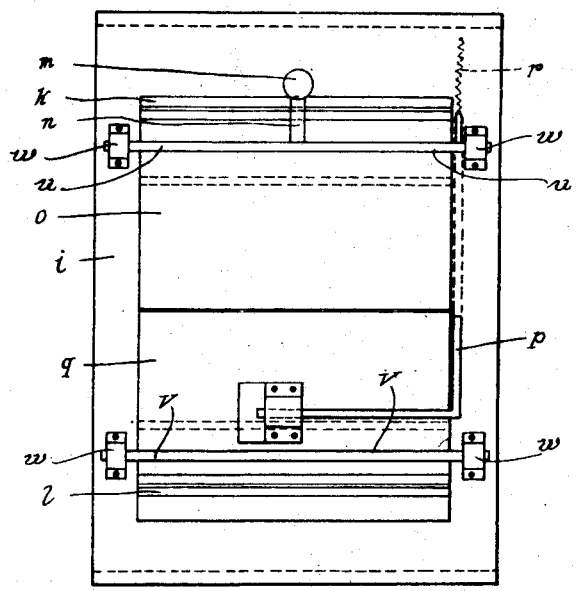

Fig. 3 is a partial side view of the camera body in section, showing the film transporting drums, while Fig. 4 is a rear view on a reduced scale of the contact printing device, as seen from the left hand side of Fig. 2.

In the form shown by Fig. 1 the apparatus is ready for projecting or enlarging photographs.

The apparatus shown by Fig. 1 comprises in its construction a camera-body $b$ having attached to it a back-plate $a$ by means of suitable clamping devices $c$ and $d$, and a sleeve $e$ mounted on the back-plate $a$ and provided with a stop-pin $f$.

The lamp casing comprises an upright frame or stand $s$ mounted on a base plate $t$ and carrying in front the stationary condenser mounted in a tube $e'$, in which is a T-slot $q$. Into this slot the stop-pin $f$ is introduced, the sleeve $e$ being then turned until the pin abuts against the upper end of the slot $f$ as indicated by Fig. 1 of the drawing, which shows the camera-body in the upright position. If the camera-body $b$ together with the back-plate $a$ is turned until the stop-pin $f$ abuts against the lower end of the slot $q$, the apparatus occupies the horizontal position indicated in Fig. 1 by the broken line $h$. The T-slot in the tube $e'$ attached to the lamp casing, together with the sleeve $e$ attached to the back-plate $a$, constitute the condenser frame and the pivotal joint situated between the camera and the lamp.

The contact printing device represented by Figs. 2–4 comprises a base-plate $i$ or frame having such a size and shape that it can be mounted on the camera-body $b$ instead of the back-plate $a$ and be secured thereon by the same clamping device ($c$ and $d$) which are used for holding together the parts $a$ and $b$. Clamps suitable for analogous purposes are well-known and not claimed as part of the invention.

This contact printing attachment may be used by introducing as well as the negative film, an unexposed positive film. The development and finished negative film N is introduced into the printing frame through a pair of openings $k$ and $l$ as indicated by dotted lines in Fig. 2, which openings can be made light-proof by means of packings $j$ of velvet or similar fabrics, the correct position for printing being obtained by hand, while the unexposed film P (Fig. 3) intended to receive the copy is wound from the film drum $x$ on to a drum $y$ forming a part of a film transporting device mounted in the camera-body immediately behind the printing frame $i$, so that the unexposed film can be drawn off the drum $x$ and exposed to the light passing through the negative film N, which has been introduced through the opening $k$. The film transporting device is preferably of the kind described in a concurrent application for patent filed March 19, 1923, Serial Number 626,207 and containing a flexible transporting band and a drawbar adapted to be operated by hand.

The printing frame comprises a light-shutter composed of a pair of flaps $o$ and $q$ which fit in the central opening left in the frame $i$ and are pivoted to the same being attached to rods or bars $u$, $v$ respectively, which turn in bearings $w$, $w$ on the frame $i$, so that the flaps can be turned symmetrically and the frame opened by depressing a button $m$ (in the direction of the arrow $s$, Fig. 2) and lever $n$ connected with the flap $o$. The lever $n$ has an arm $n^1$ connected with the other flap $q$ by a connecting rod $p$ so arranged that the two flaps or shutters $o$ and $q$ open and close at the same time. the subsequent closing of the flaps is produced by a return spring $r$ connected with the arm $n^1$.

When the shutters $o$, $q$ are open so as to expose the film, the light necessary for printing may pass through the negative film to the unexposed positive film.

What I claim is:—

A photographic film-copying apparatus comprising a contact printing frame having in the centre a rectangular opening, a pair of light shutters pivoted to the frame on opposite sides of the said opening and adapted to close the said opening by simultaneous pivotal motion at right angles to the frame, a film guide formed in the said frame by a pair of parallel slots located on opposite sides of the central opening and communicating with each other on the underside of the frame, the said slots being curved in a plane at right angles to the face of the frame and adapted to be made light-proof by means of flexible packing material, substantially as described.

In testimony whereof I have hereunto set my hand.

STANISLAUS KUCHARSKI.